United States Patent Office 3,842,045
Patented Oct. 15, 1974

3,842,045
AMORPHOUS POLYAMIDES FROM BIS(4-AMINO-CYCLOHEXYL)METHANE AND A MIXTURE OF STRAIGHT CHAIN DICARBOXYLIC ACIDS
Robert W. Campbell, Bartlesville, Okla., assignor to Phillips Petroleum Company
No Drawing. Filed July 5, 1972, Ser. No. 269,095
Int. Cl. C08g 20/20
U.S. Cl. 260—78 R  8 Claims

ABSTRACT OF THE DISCLOSURE

Substantially amorphous, optically clear polyamides are produced from bis(4-aminocyclohexyl)methane (PACM) and a mixture of straight chain dicarboxylic acids comprising dodecanedioic acid and at least one of suberic and azelaic acids. The resulting polymers are useful as fibers as well as molding resins.

This invention relates to production of polyamides. In accordance with another aspect, this invention relates to the production of amorphous, optically clear polyamides from bis(4-aminocyclohexyl)methane (PACM) and a mixture of straight chain dicarboxylic acids. In accordance with a further aspect, this invention relates to polyamides formed from PACM and a mixture of straight chain dicarboxylic acids comprising dodecanedioic acid and at least one of suberic and azelaic acids. In accordance with still another aspect, this invention relates to polyamides which are useful as fibers and molding resins.

Various polyamides formed from the condensation reaction of bis(4-aminocyclohexyl)methane, herein referred to as PACM, or methyl derivatives thereof and various dicarboxylic acids are known. Such materials are often employed as synthetic fibers, as well as being formed into other molded articles. It has now been found that there can be produced a polyamide of PAC and a mixture of straight chain dicarboxylic acids which evidences unusual properties in respect to making a polyamide suitable for molding.

Accordingly, an object of this invention is to provide novel polyamides having desirable molding characteristics.

Another object of this invention is to provide substantially amorphous, optically clear polyamides which are useful as fibers as well as for molding resins.

Other objects and aspects, as well as the several advantages of the invention, will be apparent to those skilled in the art upon reading the specification and the appended claims.

In accordance with this invention, substantially amorphous, optically clear polyamides with a good balance of mechanical properties are produced by the polymerization of bis(4-aminocyclohexyl)methane (PACM) with a mixture of straight chain dicarboxylic acids comprising dodecanedioic acid and at least one of suberic and azelaic acids.

It has been found that substantially amorphous polyamides can be produced from PACM with a mixture of about 45 to 75 mole percent, preferably about 50 to 70 mole percent, dodecanedioic acid and about 25 to 55 mole percent, preferably about 30 to 50 mole percent, suberic and/or azelaic acid. A particularly outstanding property of these polyamides is toughness, as evidenced by the high values obtained for tensile elongation and Izod impact strength. Although the polyamides of this invention are especially valuable as molding resins, they also can be used in the production of fibers. The low permeability of the polyamides to gases makes them useful as packaging materials. The bis(4-aminocyclohexyl)methane suitable for use in this invention can be represented by the formula:

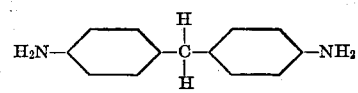

Although any of the geometric isomers or mixtures thereof can be employed, it is preferred that at least 40 percent of the PACM be of the trans,trans configuration.

The polyamides of this invention can be prepared by conventional polymerization procedures, e.g., by a melt polymerization process such as that described in U.S. Pat. 2,512,606. In the polymerization process, the molar ratio of the total dicarboxylic acids to the diamine should be substantially 1:1, although a slight excess, e.g., up to about 5 mole percent, of acids or amine can be used. The polymerization preferably is conducted at a temperature within the range of about 260–340° C. for about 2–6 hours; however, polymerization temperatures and reaction times outside these ranges can be employed. Water can be present to serve as a heat transfer agent and to aid in keeping the reactants in the reaction zone. Preferably the pressure is reduced as the polymerization progresses.

The polyamides of this invention can be blended with various fillers or additives such as pigments, stabilizers, softeners, extenders, or other polymers. For example, there can be incorporated in the polymers of this invention substances such as graphite, carbon black, titanium dioxide, glass fibers, carbon fibers, metal powders, magnesia, silica, asbestos, wollastonite, clays, wood flour, cotton floc, alpha-cellulose, mica, and the like. A more complete list of fillers is disclosed in Modern Plastics Encyclopedia, 41, No. 1a, September 1963, pages 529–536. If desired, such fillers, stabilizers, and the like can be added to the polymerization reactor.

EXAMPLE I

Generalized procedure for polyamide preparation

A nearly equimolar mixture of PACM (54 percent trans,trans) and total diacids was heated, sometimes with water present, to a final temperature of about 320° C. over a 2½-hour period under a $N_2$ atmosphere. After one hour at this temperature (pressure ranging from 20 p.s.i.g. in glass equipment to 600 p.s.i.g. in steel autoclaves), the volatiles were vented, and the mixture was heated approximately one hour under reduced pressure (20–200 mm. Hg). The polymer properties and other experimental data for Samples 1–12 are shown in Table I.

TABLE I

| Sample number | 1 | 2 | 3 | 4 | 5 | 6 | 7 | 8 | 9 | 10 | 11 | 12 |
|---|---|---|---|---|---|---|---|---|---|---|---|---|
| Diacid (mole percent)[a] | $C_{12}$(80) | $C_{12}$(70) | $C_{12}$(60) | $C_{12}$(40) | $C_{12}$(60) | $C_{12}$(50) | $C_{12}$(50) | $C_{12}$(50) | $C_{12}$(50) | $C_{10}$(72) | $C_{10}$(50) |
| Parts by wt | 3.6851 | 3.2240 | 2.7640 | 56.08 | 1.8423 | 2.7642 | 59.74 | 48.57 | 2.3033 | 2.3030 | 2.9230 | 2.0220 |
| Diacid (mole percent)[a] | $C_8$(20) | $C_8$(30) | $C_8$(40) | $C_8$(50) | $C_8$(60) | $C_9$(40) | $C_9$(50) | $C_6$(50) | $C_6$(50) | $C_{10}$(50) | $C_8$(28) | $C_8$(50) |
| Parts by wt | 0.6970 | 1.0450 | 1.3943 | 42.42 | 2.0902 | 1.5061 | 48.82 | 37.71 | 1.4615 | 2.0220 | 0.8180 | 1.4610 |
| PACM (parts by weight) | 4.2083 | 4.2082 | 4.2080 | 102.48 | 4.2080 | 4.2080 | 109.16 | 108.60 | 4.2084 | 4.2080 | 4.2292 | 4.2502 |
| Water (parts/wt.) | None | None | None | 45 | None | None | 45 | 45 | None | None | None | None |
| Inherent Viscosity[b] | 0.99 | 0.81 | 0.80 | 1.05 | 0.98 | 1.13 | 1.06 | 1.16 | 0.69 | 1.05 | 0.84 | 1.07 |
| PMT (° C.)[c] | 215 | 195 | 190 | 205 | 205 | 215 | 220 | 280 | 250 | 235 | 200 | 320 |
| $T_m$ (° C.)[d] | 246 | None | None | None | 244 | None | None | 274 | 270 | 253 | None | 280 |
| Optically Clear | Yes | Yes | Yes | Yes | Yes | Yes | Yes[e] | No | No | Yes[f] | No | No |
| Tensile strength (p.s.i. ×10⁻³)[g] | Not determined | | 8.6 | Not determined | 8.8 | 6.5 | | | Not determined | | | |

See footnotes at end of table.

TABLE I—Continued

| Sample number | 1 | 2 | 3 | 4 | 5 | 6 | 7 | 8 | 9 | 10 | 11 | 12 |
|---|---|---|---|---|---|---|---|---|---|---|---|---|
| Elongation (percent)[g] | | Not determined | | 22 | Not determined | 34 | 8 | | | Not determined | | |
| Flexural modulus (p.s.i. ×10⁻⁵).[h] | | Not determined | | 2.2 | Not determined | 2.0 | 2.8 | | | Not determined | | |
| Izod impact strength (ft.-lb./in notch).[i] | | Not determined | | 1.9 | Not determined | 1.7 | 0.8 | | | Not determined | | |
| Heat deflection temp., 264 p.s.i. (°F.).[j] | | Not determined | | 279 | Not determined | 244 | 297 | | | Not determined | | |

[a] $C_6$, $C_8$, $C_9$, $C_{10}$, and $C_{12}$ represent adipic acid, suberic acid, azelaic acid, sebacic acid, and dodecanedioic acid, respectively; the mole percent is based on the total diacids present.
[b] Measured at 30° C. on m-cresol solutions having a polyamide concentration of 0.5 g./100 ml. solution.
[c] Polymer melt temperature; determined by placing the polymer sample on a heated bar with a temperature gradient.
[d] Crystalline melting point; determined by differential thermal analysis.
[e] A sample of a similar polymer prepared on a much smaller scale was observed to exhibit a trace of crystallinity as evidenced by a $T_m$ of 229° C.
[f] Although the polymer was obtained as a clear material, differential thermal analysis showed it to be crystallizable and therefore would be expected to develop haze upon annealing or when contacted with a suitable solvent.
[g] ASTM D 638-68.
[h] ASTM D 790-66.
[i] ASTM D 256-56.
[j] ASTM D 648-56.

In Table I, Samples 2, 3, 4, 6, and 7 represent polyamides within the scope of this invention. Each of these polyamides was optically clear by visual observation, and each was wholly or nearly completely amorphous as determined by differential thermal analysis. Mechanical properties were determined for the polyamides of Samples 4 and 7, and the overall balance of these properties was quite good. Particularly outstanding was the toughness of the polymers, as evidenced by the high values obtained for tensile elongation and Izod impact strength, and as contrasted with the inferior toughness of the structurally related polyamide of Sample 8, a polyamide outside the scope of this invention.

Included in Table I are Samples, 1, 5, 8, 9, 10, 11, and 12 showing properties of related polyamides outside the scope of this invention. The polyamides of Samples 1 and 5 were prepared through use of dodecanedioic acid: suberic acid ratios outside the scope of this invention, and the polyamides of Samples 8, 9, 10, 11, and 12 were structurally related polyamides outside the scope of this invention. Each of these polyamides was optically opaque as determined by visual observation and/or exhibited a crystalline melting point as determined by differential thermal analysis. In any event, objects fabricated from these polyamides would be expected to develop haze when subjected to conditions conducive to crystallization, e.g., temperatures above the glass transition temperature, boiling water, contact with a swelling agent, and the like.

As indicated hereinbefore, the substantially amorphous polyamides of the invention have utility as molding resins, fibers, films, or packaging materials.

I claim:

1. A substantially amorphous, optically clear solid polyamide resin consisting essentially of the polymeric condensation reaction product of (a) bis(4-aminocyclohexyl)methane of 40–54 percent trans,trans configuration and (b) a mixture of 50–70 mole percent dodecanedioic acid and 50–30 mole percent suberic acid or a mixture of 50–70 mole percent dodecanedioic acid and 50–30 mole percent azelaic acid.

2. A polyamide according to claim 1 wherein (a) is bis(4-aminocyclohexyl)methane having a trans,trans isomer content of 54 percent.

3. A textile fiber or film composed of the polyamide of claim 1.

4. A textile fiber composed of the polyamide of claim 1.

5. A film composed of the polyamide of claim 1.

6. A polyamide according to claim 1 wherein (b) consists essentially of 50–70 mole percent dodecanedioic acid and 30–50 mole percent suberic acid.

7. A polyamide according to claim 1 wherein (b) consists essentially of 50–70 mole percent dodecanedioic acid and 30–50 mole percent azelaic acid.

8. A polyamide according to claim 1 wherein (a) is bis(4-aminocyclohexyl)methane having a trans,trans isomer content of 54 percent and (b) consists essentially of equimolar ratio of dodecanedioic acid and suberic acid or an equimolar ratio of dodecanedioic acid and azelaic acid.

References Cited
UNITED STATES PATENTS 3,393,210   7/1968   Speck _____ 260—78 R
2,512,606   6/1950   Bolton et al. _____ 260—78 R HAROLD D. ANDERSON, Primary Examiner U.S. Cl. X.R.

260—9, 33.4 R, 37 N